(12) United States Patent
Huang

(10) Patent No.: US 8,914,484 B2
(45) Date of Patent: Dec. 16, 2014

(54) METHOD FOR MANAGING SERVER APPARATUSES AND MANAGEMENT APPARATUS THEREOF

(75) Inventor: Wen-Hsuan Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 851 days.

(21) Appl. No.: 13/115,113

(22) Filed: May 25, 2011

(65) Prior Publication Data

US 2012/0084424 A1    Apr. 5, 2012

(30) Foreign Application Priority Data

Sep. 30, 2010   (TW) ................................ 99133382 A

(51) Int. Cl.
| | | |
|---|---|---|
| G06F 15/16 | (2006.01) | |
| G06F 15/173 | (2006.01) | |
| G06F 11/30 | (2006.01) | |
| H04L 12/24 | (2006.01) | |
| H04L 12/26 | (2006.01) | |

(52) U.S. Cl.
CPC ........ *G06F 11/3058* (2013.01); *G06F 11/3006* (2013.01); *G06F 11/302* (2013.01); *G06F 11/3051* (2013.01); *G06F 11/3055* (2013.01); *H04L 41/0853* (2013.01); *H04L 41/0206* (2013.01); *H04L 43/0817* (2013.01); *H04L 43/16* (2013.01)
USPC ................. 709/223; 709/201; 726/26; 713/2; 713/159; 719/321; 719/323; 719/328

(58) Field of Classification Search
CPC ............ G06F 11/3055; G06F 41/0853; G06F 11/3058; G06F 11/3006; G06F 11/302; G06F 11/3051; H04L 29/06; H04L 41/22; H04L 41/12; H04L 29/08072
USPC .......................................................... 709/223
See application file for complete search history.

(56) References Cited

U.S. PATENT DOCUMENTS

| | | | |
|---|---|---|---|
| 8,370,748 B1* | 2/2013 | Maity | 715/738 |
| 2005/0038808 A1* | 2/2005 | Kutch | 707/102 |
| 2006/0095551 A1 | 5/2006 | Leung et al. | |

(Continued)

FOREIGN PATENT DOCUMENTS

| | | |
|---|---|---|
| CN | 1617104 | 5/2005 |
| CN | 101202759 | 6/2008 |

(Continued)

OTHER PUBLICATIONS

"Office Action of Taiwan Counterpart Application", issued on Aug. 14, 2013, p. 1-p. 7, in which the listed references were cited.

(Continued)

*Primary Examiner* — Tauqir Hussain
(74) *Attorney, Agent, or Firm* — Jianq Chyun IP Office

(57) ABSTRACT

A method for managing server apparatuses and a management apparatus thereof are provided. A server apparatus is searched in the management apparatus for receiving an Internet Protocol (IP) address from a Baseboard Management Controller (BMC) of the server apparatus. And identification information of an Operating System (OS) of the server apparatus is obtained according to the IP address. The IP address and the identification information are bound. Then, an out-of-band message received from the BMC is updated into a server object according to the identification information.

10 Claims, 3 Drawing Sheets

(56) References Cited

U.S. PATENT DOCUMENTS

| | | | |
|---|---|---|---|
| 2007/0055793 A1* | 3/2007 | Huang et al. | 710/8 |
| 2008/0225710 A1* | 9/2008 | Raja et al. | 370/230.1 |
| 2009/0025008 A1* | 1/2009 | Hung | 719/312 |
| 2009/0089624 A1* | 4/2009 | Austen et al. | 714/39 |
| 2009/0182799 A1* | 7/2009 | Huang | 709/201 |
| 2010/0257597 A1* | 10/2010 | Miyazaki | 726/8 |
| 2011/0066871 A1* | 3/2011 | Farmer et al. | 713/340 |
| 2011/0202685 A1* | 8/2011 | Subramaniam et al. | 709/245 |
| 2012/0072745 A1* | 3/2012 | Ahluwalia et al. | 713/320 |

FOREIGN PATENT DOCUMENTS

| | | |
|---|---|---|
| CN | 101540694 | 9/2009 |
| TW | 200713948 | 4/2007 |
| TW | 200718090 | 5/2007 |
| TW | 200825762 | 6/2008 |
| TW | 200903248 | 1/2009 |
| TW | 200943062 | 10/2009 |
| TW | 201020769 | 6/2010 |

OTHER PUBLICATIONS

"Search Report of European Counterpart Application", issued on Jan. 31, 2012, p. 1-p. 8, in which the listed references were cited.

"Office Action of China Counterpart Application", issued on Oct. 30, 2013, p. 1-p. 10, in which the listed references were cited.

* cited by examiner

METHOD FOR MANAGING SERVER APPARATUSES AND MANAGEMENT APPARATUS THEREOF

CROSS-REFERENCE TO RELATED APPLICATION

This application claims the priority benefit of Taiwan application serial no. 99133382, filed Sep. 30, 2010. The entirety of the above-mentioned patent application is hereby incorporated by reference herein and made a part of this specification.

BACKGROUND OF THE INVENTION

1. Field of the Invention

The present invention generally relates to a server management architecture, in particular, to a method for managing server apparatuses and a management apparatus thereof.

2. Description of Related Art

Existing server management architecture mainly uses two manners for management, namely, an in-band manner and an out-of-band manner. The in-band manner is based on a standard Ethernet channel, and a management end cannot manage a managed end unless the managed end is in a state of being turned on and loading an Operating System (OS). The out-of-band manner is based on a dedicated management channel; therefore, the management end can manage the managed end in the out-of-band manner, even when the managed end in a shutdown state.

For example, a common server system generally has a Baseboard Management Controller (BMC) which may transmit a value (such as a temperature or a fan speed) sensed by a sensor to the management end in the out-of-band manner. Accordingly, when an anomaly occurs to the system, the BMC of the main board of the managed end sends a Platform Event Trap (PET) message using an Internet Protocol (IP) address of the BMC as identification information to the management end in the out-of-band manner, and the message contains information such as a cause of the problem.

However, server management software in the existing management end mainly uses an IP address of an OS or a hostname as identification information of a management target; therefore, the message cannot be updated into a server object in the out-of-band manner.

SUMMARY OF THE INVENTION

Accordingly, the present invention is directed to a method for managing server apparatuses and a management apparatus thereof, which can manage a server in an in-band manner and an out-of-band manner at the same time.

Specifically, the present invention provides a method for managing server apparatuses, applicable to a management apparatus. The method includes the following steps: searching a server apparatus to be managed; receiving an IP address of a BMC from the BMC of the server apparatus; obtaining identification information of an OS of the server apparatus according to the IP address; binding the IP address and the identification information; and updating an out-of-band message received from the BMC into a server object according to the identification information.

According to an embodiment of the present invention, in the step of searching the server apparatus to be managed, the server apparatus to be managed may be searched within an address search range.

According to an embodiment of the present invention, in the step of receiving the IP address of the BMC from the BMC of the server apparatus, a packet may be received from the BMC of the server apparatus through a Remote Management Control Protocol (RMCP), and the packet includes the IP address and may further include the identification information of the OS of the server apparatus. In the step of obtaining the identification information of the OS of the server apparatus according to the IP address, the corresponding identification information may be obtained from the packet. In addition, the corresponding identification information may also be obtained by querying a lookup table.

According to an embodiment of the present invention, the step of updating the out-of-band message received from the BMC into the server object according to the identification information includes: analyzing the out-of-band message to obtain the IP address, a sensor type and an event type; determining a state of the server apparatus according to the event type; and updating the state of the server apparatus into the server object according to the identification information.

According to an embodiment of the present invention, the identification information includes the IP address of the OS or a hostname.

The present invention further provides a management apparatus, which includes a searching unit, a binding unit and a management engine. The searching unit is used for searching a server apparatus to be managed, and receiving an IP address of a BMC from the BMC of the server apparatus. The binding unit is used for obtaining identification information of an OS of the server apparatus according to the IP address, and binding the IP address and the identification information. The management engine is used for updating an out-of-band message received from the BMC into a server object according to the identification information.

According to an embodiment of the present invention, the management apparatus further includes a parsing unit. The parsing unit is used for analyzing the out-of-band message to obtain the IP address, a sensor type and an event type, and determining a state of the server apparatus according to the event type, so as to enable the management engine to update the state of the server apparatus into the server object according to the identification information.

According to an embodiment of the present invention, the binding unit may be used for querying a lookup table to obtain the identification information corresponding to the IP address. Furthermore, the binding unit may obtain the IP address and the identification information of the OS of the server apparatus according to a packet received by the searching unit.

According to an embodiment of the present invention, the searching unit communicates with the BMC of the server apparatus through an RMCP.

Based on the above, according to the present invention, an in-band message (for example, a message using the hostname or the IP address of the OS as the identification information) and an out-of-band message (for example, a message using the IP address of the BMC as the identification information) can be received and bound, and thus the server apparatus can be managed in an in-band manner and an out-of-band manner at the same time.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
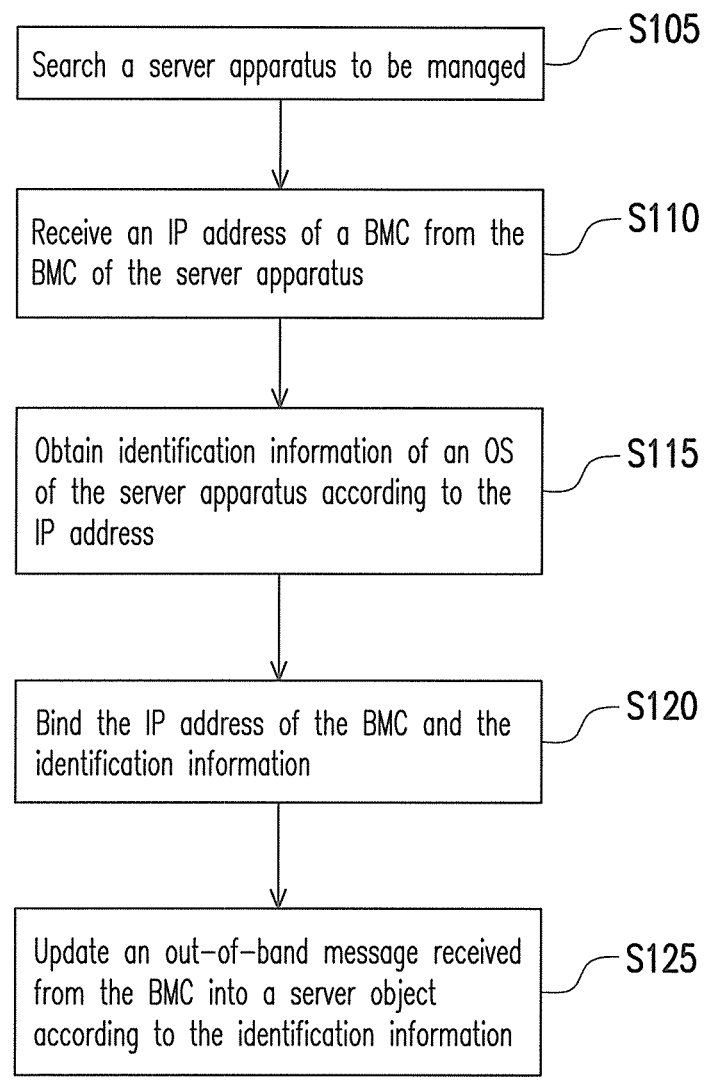
FIG. 1A is a flow chart of a method for managing server apparatuses according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Existing software for managing a server mainly uses an IP address of an OS or a hostname as identification information of a management target; therefore, an out-of-band message cannot be updated into a server object. Accordingly, the present invention provides a method for managing a server apparatus and a management apparatus thereof, so that the out-of-band message can be updated into the server object of the management apparatus.

FIG. 1A is a flow chart of a method for managing server apparatuses according to an embodiment of the present invention. This embodiment is applicable to a management apparatus. Referring to FIG. 1A, in Step S105, a server apparatus to be managed is searched. Here, the management apparatus may search the server apparatus to be managed by searching an IP address of a BMC. For example, a user interface may be provided to enable the user to input an address search range (which may also be a default value), so as to enable the management apparatus to search the server apparatus to be managed within the address search range. The searching mode may be regular searching or immediate searching. Furthermore, the server apparatus found may be listed in the user interface for selection by the user. Generally, the BMC of the server apparatus has a network interface card, so that the management apparatus may search the server apparatus to be managed by searching the IP address of the BMC.

Next, in Step S110, the IP address of the BMC is received from the BMC of the server apparatus. For example, a packet is received from the BMC of the server apparatus through an RMCP, and the packet records the IP address of the BMC.

Then, in Step S115, identification information of an OS of the server apparatus is obtained according to the IP address. Specifically, the IP address transmitted by the BMC is the IP address of the network interface card of the BMC, and the management apparatus cannot update a message of the server apparatus into a server object through the IP address. Therefore, in this embodiment, the management apparatus obtains the identification information of the OS according to the IP address of the BMC. Here, for example, the identification data may be an IP address used by the OS of the server apparatus or a hostname of the server apparatus.

For example, a lookup table is set in the management apparatus, and the IP address and the corresponding identification data are recorded in the lookup table in advance. Alternatively, a user interface may be provided to enable the user to input the identification data corresponding to the IP address. Furthermore, the identification information may be recorded in the packet for carrying the IP address of the BMC. For example, when the server apparatus is turned on, the identification information such as the IP address of the OS or the hostname is stored in the BMC. When the management apparatus intends to manage the server apparatus, the BMC transmits the packet having the IP address of the BMC and the corresponding identification data to the management apparatus through the RMCP. Accordingly, the management apparatus can obtain the corresponding identification data from the packet.

After the identification information is obtained, as shown in Step S120, the IP address of the BMC and the identification information are bound. Then, in Step S125, an out-of-band message received from the BMC is updated into the server object according to the identification information (such as the IP address of the OS). Specifically, when the server apparatus is managed, the IP address of the BMC may be updated into the server object, and a destination for sending the out-of-band message is set to be the management apparatus, and then the out-of-band message can be sent to the management apparatus.

Figure 1B:
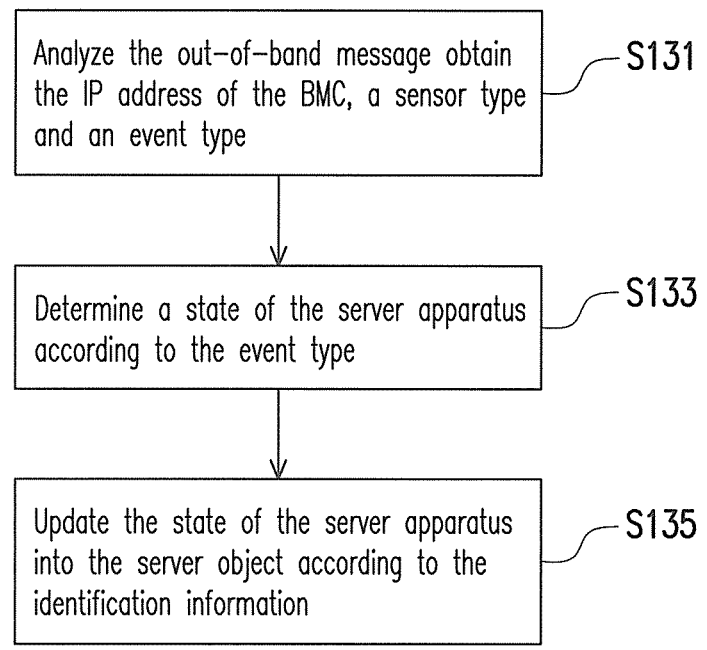
FIG. 1B is a flow chart of detailed steps of Step S125 in FIG. 1A.

It should be noted that the steps of the above flow are merely for the purpose of describing an embodiment of the present invention, but not intended to limit the present invention. In other embodiments, the method may further include other intermediate steps, or several steps may be combined into a single step, which also falls within the scope of the present invention. For example, referring to FIG. 1B, detailed steps of Step S125 are shown. As shown in FIG. 1B, in Step S131, the out-of-band message is analyzed to obtain the IP address of the BMC, a sensor type and an event type. Then, in Step S133, a state of the server apparatus is determined according to the event type. Finally, in Step S135, the state of the server apparatus is updated into the server object according to the identification information.

Another example is given below to describe the architecture of a server management system.

Figure 2:
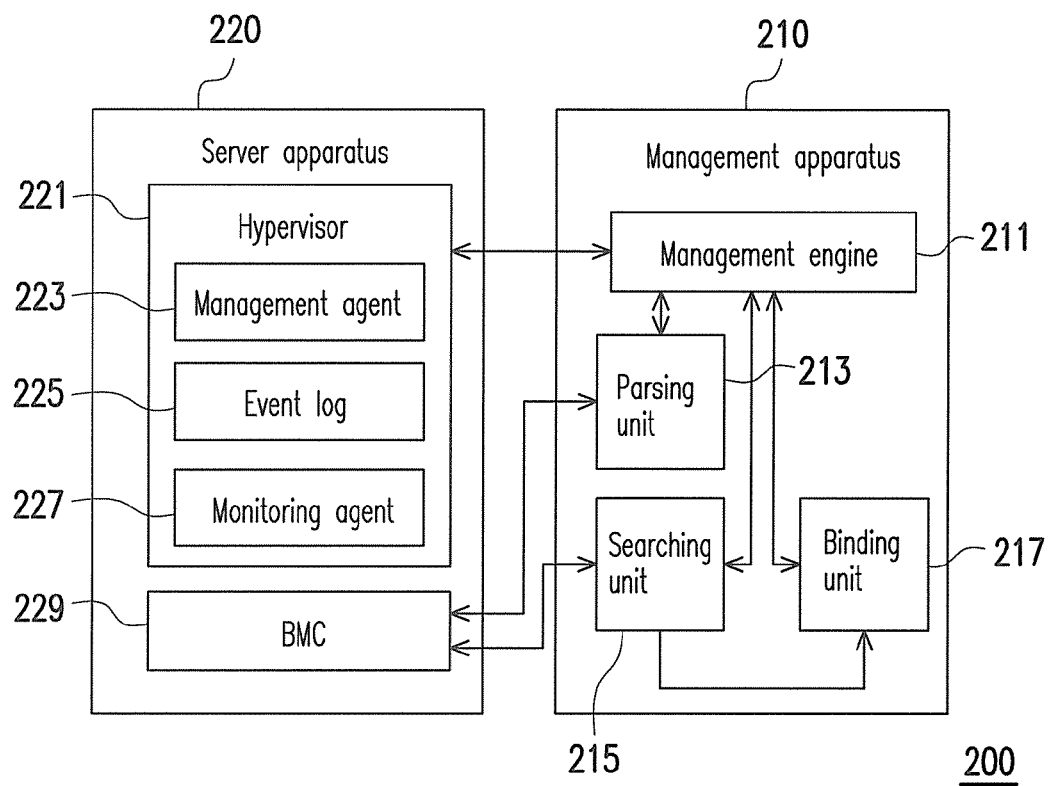
FIG. 2 is a block diagram of a server management system according to an embodiment of the present invention.

FIG. 2 is a block diagram of a server management system according to an embodiment of the present invention. Referring to FIG. 2, the server management system 200 includes a management apparatus 210 and a server apparatus 220, and the server apparatus 220 is managed through the management apparatus 210. The management apparatus 210 includes a management engine 211, a parsing unit 213, a searching unit 215 and a binding unit 217. The server apparatus 220 includes a hypervisor 221 and a BMC 229, and the hypervisor 221 has a management agent 223, an event log 225, and a monitoring agent 227.

Generally, in the server apparatus 220, when an anomaly occurs to an application program or hardware, the monitoring agent 227 writes a related message into the event log 225. The management agent 223 periodically checks whether the event log 225 has a message required to be monitored, and sends back the message using a hostname (or an IP address of an OS) as identification information to the management engine 211 of the management apparatus 210 in an in-band manner, so as to update a state of the server apparatus 220 (that is, a server object) in a database of the management apparatus 210. Therefore, when the server apparatus 220 is not turned on or fails, an out-of-band message is transmitted to the management apparatus 210 through the BMC 229. The components of the management apparatus 210 are introduced individually below.

In the management apparatus 210, the searching unit 215 is used for searching a server apparatus to be managed (for example, the server apparatus 220), and receiving the IP address of the BMC 229 through the BMC 229 of the server apparatus 220. Furthermore, the searching unit 215 may be further used for newly adding a server object. That is to say, when the searching unit 215 takes the server apparatus 220 into management, a server object is newly added, and the IP address of the BMC 229 is updated into the server object.

The binding unit 217 is used for obtaining the identification information of the OS of the server apparatus 220 according to the IP address of the BMC 229, and binding the IP address and the identification information. Furthermore, the binding unit 217 may be further used for querying a lookup table to obtain the identification information corresponding to the IP address. Alternatively, the binding unit 217 may obtain the IP address and the identification information of the OS of the server apparatus 220 according to a packet received by the searching unit 215.

The management engine 211 is used for updating the out-of-band message received from the BMC 229 into the server object according to the identification information.

In this embodiment, the parsing unit 213 of the management apparatus 210 is used for analyzing the out-of-band message to obtain the IP address of the BMC 229, a sensor type and an event type, and determining a state of the server apparatus 220 according to the event type, so as to enable the management engine 211 to update the state of the server apparatus 220 into the server object according to the identification information.

Here, the out-of-band message is, for example, a platform event trap (PET) message. When the parsing unit 213 receives the PET message, the parsing unit 213 analyzes the PET message. The PET message includes the IP address of the BMC 229 for transmitting the PET message, and the sensor type and the event type monitored by the BMC 229. The sensor type is, for example, a fan sensor or a power sensor, and the event type is, for example, a speed event or a temperature event. For example, if the sensor type is the fan sensor, the corresponding event type is the speed event. The parsing unit 213 analyzes the PET message to obtain the current state of the server apparatus 220.

Figure 3:
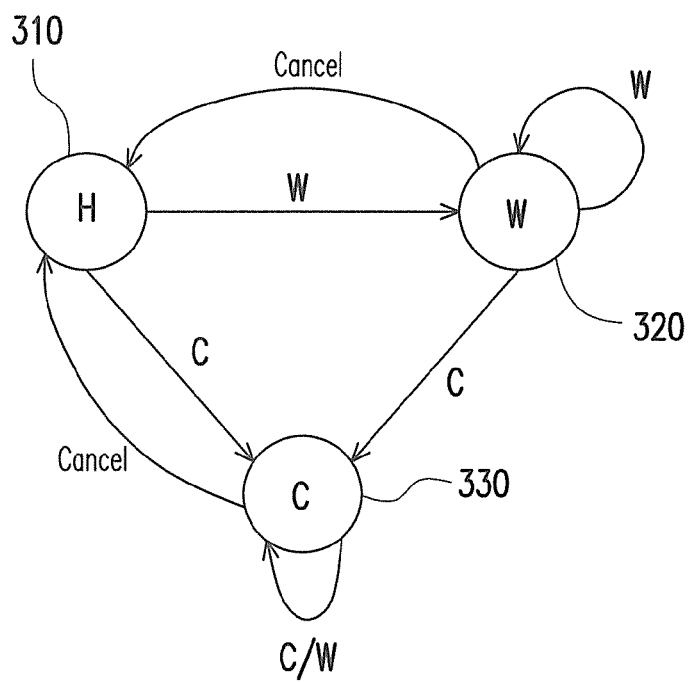
FIG. 3 is a state machine diagram according to an embodiment of the present invention.

FIG. 3 is a state machine diagram according to an embodiment of the present invention. Referring to FIG. 3, a state 310 represents a healthy state (denoted by "H") of the server apparatus 220, a state 320 represents a warning state (denoted by "W") of the server apparatus 220, and a state 330 represents a critical point state (denoted by "C") of the server apparatus 220.

In this embodiment, when the state of the server object is the state 310, and if the received event state is "W", the state of the server object changes to the state 320; and if the received event state is "C", the state of the server object changes to the state 330.

When the state of the server object is the state 320, and if the received event state is "W", the state of the server object is still the state 320; and if the received event state is "C", the state of the server object changes to the state 330. Furthermore, if the received event state is "cancel" (for example, the speed returns to be normal), the state of the server object changes to the state 310.

When the state of the server object is the state 330, and if the received event state is "C" or "W", the state of the server object is still the state 330. Furthermore, if the received event state is "cancel" (for example, the speed returns to be normal), the state of the server object changes to the state 310.

Furthermore, in other embodiments, by taking the event state being the speed event as an example, it may be set that when the speed is less than a first threshold, the state of the server object is "H"; when the speed is greater than the first threshold, the state of the server object is "W"; when the speed is greater than a second threshold (the second threshold is greater than the first threshold), the state of the server object is "WW"; and when the speed is greater than a third threshold, the state of the server object is "C". When the current state is "WW", and if the speed is less than the second threshold and greater than the first threshold, the state changes from "WW" to "W"; and if the speed is less than the first threshold, the state changes to "H". Here, the example is taken for description only, but the present invention is not limited thereto.

Accordingly, the parsing unit 213 resides in the management apparatus 210, and is responsible for receiving the out-of-band message and analyzing the information, so as to enable the management engine 211 to update the out-of-band message into the server object.

Based on the above, according to the present invention, an in-band message (for example, a message using the hostname or the IP address of the OS as the identification information) and an out-of-band message (for example, a message using the IP address of the BMC as the identification information) can be received and bound, and thus the server apparatus can be managed in an in-band manner and an out-of-band manner at the same time.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing server apparatuses, applicable to a management apparatus, the method comprising:
    searching a server apparatus to be managed by the management apparatus;
    receiving an Internet Protocol (IP) address of a Baseboard Management Controller (BMC) from the BMC of the server apparatus by the management apparatus;
    obtaining identification information of an Operating System (OS) of the server apparatus according to the IP address by the management apparatus;
    binding the IP address and the identification information by the management apparatus; and
    updating an out-of-band message received from the BMC into a server object of the management apparatus according to the identification information by the management apparatus;
    wherein the step of updating the out-of-band message received from the BMC into the server object of the management apparatus according to the identification information by the management apparatus comprises:
    analyzing the out-of-band message to obtain the IP address, a sensor type and an event type;
    determining a state of the server apparatus according to the event type; and
    updating the state of the server apparatus into the server object of the management apparatus according to the identification information.

2. The method according to claim 1, wherein the step of searching the server apparatus to be managed by the management apparatus comprises:
    searching the server apparatus to be managed within an address search range.

3. The method according to claim 1, wherein the step of receiving the IP address of the BMC from the BMC of the server apparatus by the management apparatus comprises:
    receiving a packet from the BMC of the server apparatus through a Remote Management Control Protocol (RMCP), wherein the packet comprises the IP address.

4. The method according to claim 3, wherein the step of obtaining the identification information of the OS of the server apparatus according to the IP address by the management apparatus comprises:

obtaining the identification information from the packet.

5. The method according to claim 1, wherein the step of obtaining the identification information of the OS of the server apparatus according to the IP address by the management apparatus comprises:

querying a lookup table to obtain the identification information corresponding to the IP address.

6. The method according to claim 1, wherein the identification information obtained by the management apparatus comprises the IP address of the OS or a hostname.

7. A management apparatus, comprising:
a storage unit, comprising a plurality of programes;
a processing unit, coupled to the storage unit, for executing the programes, wherein the programes comprises:
a searching unit, arranged for searching a server apparatus to be managed, and receiving an Internet Protocol (IP) address of a Baseboard Management Controller (BMC) from the BMC of the server apparatus;
a binding unit, arranged for obtaining identification information of an Operating System (OS) of the server apparatus according to the IP address, and binding the IP address and the identification information; and
a management engine, arranged for updating an out-of-band message received from the BMC into a server object of the management apparatus according to the identification information;
wherein the programes further comprising:
a parsing unit, arranged for analyzing the out-of-band message to obtain the IP address, a sensor type and an event type, and determining a state of the server apparatus according to the event type, so as to enable the management engine to update the state of the server apparatus into the server object according to the identification information.

8. The management apparatus according to claim 7, wherein the binding unit is further arranged for queriing a lookup table to obtain the identification information corresponding to the IP address.

9. The management apparatus according to claim 7, wherein the binding unit is further arranged for obtaining the IP address and the identification information of the OS of the server apparatus according to a packet received by the searching unit.

10. The management apparatus according to claim 7, wherein the searching unit is further arranged for communicating with the BMC of the server apparatus through a Remote Management Control Protocol (RMCP).

* * * * *